United States Patent
Sun et al.

(10) Patent No.: US 12,382,166 B2
(45) Date of Patent: Aug. 5, 2025

(54) FLEXIBLE AND INTUITIVE SYSTEM FOR CONFIGURING AUTOMATED VISUAL INSPECTION SYSTEM

(71) Applicants: Kapito Inc., Hsinchu (TW); Feng-Tso Sun, Hsinchu (TW); Yi-Ting Yeh, Hsinchu (TW); Feng-Yu Sun, Hsinchu (TW)

(72) Inventors: Feng-Tso Sun, Hsinchu (TW); Yi-Ting Yeh, Hsinchu (TW); Feng-Yu Sun, Hsinchu (TW); Jyun-Tang Huang, Hsinchu (TW); Rong-Hua Chang, Hsinchu County (TW); Meng-Tse Shen, Hsinchu (TW)

(73) Assignees: KAPITO INC., Hsinchu (TW); Feng-Tso Sun, Hsinchu (TW); Yi-Ting Yeh, Hsinchu (TW); Feng-Yu Sun, Hsinchu (TW)

( * ) Notice: Subject to any disclaimer, the term of this patent is extended or adjusted under 35 U.S.C. 154(b) by 13 days.

(21) Appl. No.: 18/583,865

(22) Filed: Feb. 22, 2024

(65) Prior Publication Data
US 2024/0284044 A1   Aug. 22, 2024

(30) Foreign Application Priority Data
Feb. 22, 2023   (TW) .................................. 112106428

(51) Int. Cl.
  *H04N 23/66* (2023.01)
  *B25J 19/02* (2006.01)
  (Continued)

(52) U.S. Cl.
CPC ............ *H04N 23/66* (2023.01); *B25J 19/023* (2013.01); *G01C 21/1652* (2020.08);
(Continued)

(58) Field of Classification Search
None
See application file for complete search history.

(56) References Cited

U.S. PATENT DOCUMENTS

2020/0021743 A1* 1/2020 Yoshida ................. B25J 9/1697
2021/0133496 A1* 5/2021 Barnehama ............. G06F 18/41
(Continued)

FOREIGN PATENT DOCUMENTS

JP         2003211382 A       7/2003
JP         2021047104 A       3/2021
(Continued)

OTHER PUBLICATIONS

Protopapadakis, "Autonomous robotic inspection in tunnels" (Year: 2016).*

*Primary Examiner* — Eileen M Adams
(74) *Attorney, Agent, or Firm* — ANOVA LAW GROUP, PLLC

(57) ABSTRACT

A flexible and intuitive system is disclosed, and is disposed to be coupled to at least one camera, at least one robotic arm and a host electronic device of an AVI system. During a normal operation of the system, a configuration parameter setting of the AVI system can be completed after at least one time of robotic arm setting operation and at least one time of camera setting operation are conducted. After that, a plurality of article images acquired from a specific article by the camera are upload to a remote electronic device by the system, such that the remote electronic device utilizes the article images to update (re-train) a defect recognition model. Consequently, after the system integrates the defect recognition model into a defect recognition program that is installed in the host electronic device, the AVI system is hence configured for conducting an appearance inspection of the article.

13 Claims, 7 Drawing Sheets

(51) Int. Cl.
*G01C 21/16* (2006.01)
*G06T 7/00* (2017.01)
*G06V 10/141* (2022.01)
*G06V 10/764* (2022.01)
*G06V 10/774* (2022.01)
*G06V 10/94* (2022.01)
*H04N 23/56* (2023.01)
*H04N 23/62* (2023.01)
*H04N 23/695* (2023.01)

(52) U.S. Cl.
CPC .......... *G06T 7/0004* (2013.01); *G06V 10/141* (2022.01); *G06V 10/764* (2022.01); *G06V 10/774* (2022.01); *G06V 10/945* (2022.01); *H04N 23/56* (2023.01); *H04N 23/62* (2023.01); *H04N 23/695* (2023.01); *G06T 2207/20081* (2013.01); *G06V 2201/06* (2022.01)

(56) References Cited

U.S. PATENT DOCUMENTS

2022/0214290 A1* 7/2022 Maeder ................. G06T 7/0004
2024/0104911 A1* 3/2024 Onishi ....................... B07C 5/10

FOREIGN PATENT DOCUMENTS

JP        2022037856 A     3/2022
TW         M355371 U      4/2009

* cited by examiner

FLEXIBLE AND INTUITIVE SYSTEM FOR CONFIGURING AUTOMATED VISUAL INSPECTION SYSTEM

CROSS-REFERENCE TO RELATED APPLICATION

This application claims the priority of Taiwan Patent Application No. 112106428, filed on Feb. 22, 2023, the content of which is incorporated by reference in its entirety.

BACKGROUND OF THE INVENTION

Technical Field

The present invention relates to the technology field of machine vision, and more particularly to a flexible and intuitive system for configuring an automated visual inspection system.

Background

It is well known that industrial products and/or semi-finished products need to receive a quality inspection before shipment or being transferred to next processing stage, in which the quality inspection commonly includes appearance inspection and function test. According to practical experience, inspection personnel is casually leaded to have missed inspection or false inspection while conducting an appearance inspection of a lot of products. Accordingly, instead of the inspection personnel, an automated visual inspection (AVI) system using machine vision is applied in an industrial automation system, thereby being adopted for conducting the appearance inspection of industrial products and/or semi-finished products, instead of the inspection personnel. For example, Taiwan Patent No. M355371U discloses an AVI system for conducting the appearance inspection of screw nuts and/or gears, and the AVI system mainly comprises a light source, at least one camera, and an electronic device including at least one processor and a memory.

In general, a standard appearance inspection can be accomplished through inspecting multiple surfaces of a product by operating the aforesaid AVI system. However, owing to the customization screw nuts and/or gears being not mass production and having product variety, a system operator or the inspection personnel needs to re-set a plurality of configuration parameters before operating an AVI system, configured for conducting an appearance inspection of model A customization products before, to conduct an appearance inspection of model B customization products. In addition, for enhancing the inspection accuracy of the AVI system, product manufacture needs to provide a plurality of golden samples (i.e., normal images of the model B customization product) and a plurality of defect samples (i.e., defect-containing images of the model B customization product) to the supplier of the AVI system, such that the supplier is able to update a database and a defect recognition program stored in the memory of the electronic device. As explained in more detail below, each said defect-containing image of the model B customization product contain at least one type of defect, and is labeled with a defect classification item. Taking a gear as an example of said model B customization product, break, lack, scratch, and collapse angle are four common defect classification items. By such arrangements, when operating the AVI system to conduct an appearance inspection (or called "defect inspection") of a lot of model B gears, the electronic device controls the camera to acquire at least one gear image from said model B gear, and then the defect recognition program extracts at least one feature from said gear image and at least one reference defect feature from the defect-containing gear image. Eventually, the defect recognition program applies a feature matching process to the at least one feature and the at least one reference defect feature, thereby classifying the defects existing in the gear image of said model B gear with a specific defect classification item.

Computer science (CS) engineers skilled in development of the AVI system certainly know that, the aforesaid configuration parameters at least include illuminance of the light source and disposing height, disposing angle and aperture of the camera, and the camera can be controlled to photograph each type of defect of the model B gear after the AVI system is set by the configuration parameters. Moreover, CS engineers also know that the defect recognition program is integrated with a defect recognition model therein, and the defect recognition model is commonly produced after following steps are completed:

(a) importing a plurality of golden samples (i.e., normal images of the model B gear) and a plurality of defect samples (i.e., defect-containing images of the model B gear) to a machine learning model, in which each said defect-containing image is labeled with a defect classification item;

(b) adjusting at least one model parameter of the machine learning model;

(c) importing a plurality of test images of the model B gear to the machine learning model, and then calculating a defect recognition accuracy after reviewing a defect recognition result outputted by the machine learning model;

(d) re-conducting the foregoing steps (b) and (c) in case of the defect recognition accuracy not exceeding a threshold value; and (e) taking the machine learning model as a defect recognition model in case of defect recognition accuracy exceeding the threshold value, and then integrating the defect recognition model into the defect recognition program that is stored in the memory of the electronic device.

It should be understood that, the normal images and the defect-containing images of the model B gear are all provided by the manufacturer. Therefore, after the model B gear has a specific type of defect newly found by the inspection personnel, the manufacturer certainly requests the supplier of the AVI system to modulate the configuration parameters for making the camera of the AVI system be able to clearly photograph all types of defects of the model B gear, including the newly found specific type of defect. Moreover, the supplier should also update (re-train), by utilizing newly acquired gear images of the model B gear, the defect recognition model (i.e., the aforesaid machine learning model) for guaranteeing the defect recognition accuracy of the defect recognition model. It can be imagined that, if the supplier's company and the manufacturer's factory locate in city A and city B, respectively, engineers of the supplier not only fail to move from city A to city B in an acceptable short time, but are also unable to accomplish the proper adjustments of the configuration parameters of the AVI system.

For above reasons, to develop a new model of AVI system with functionality of allowing the system operator or the inspection personnel to complete the configuration parameter setting by a flexible and intuitive way is worthy of consideration. Accordingly, inventors of the present application have made great efforts to make inventive research and eventually provided a flexible and intuitive system for configuring an automated visual inspection system.

SUMMARY

The primary objective of the present invention is to provide a flexible and intuitive system, which is presented in a form of an electronic device for use in conducting a configuration parameter setting of an automated visual inspection (AVI) system that comprises a host electronic device, at least one robotic arm and at least one camera that is held by the at least one robotic arm. The electronic device is coupled to the host electronic device, thereby communicating with the camera and the robotic arm. Therefore, when conducting the configuration parameter setting, at least one time of robotic arm setting operation for the robotic arm and at least one time of camera setting operation for the camera are conducted, such that a plurality of article images are acquired from an article by the camera. After said robotic arm setting operation and said camera setting operation are completed, an external camera setting parameter and an internal camera setting parameter corresponding to the article are recorded by the electronic device. After that, the electronic device transmits the plurality of article images to a remote electronic device, and then the remote electronic device utilizes the article images to update (re-train) a defect recognition model. As a result, after electronic device updates, based on the re-trained defect recognition model, the defect recognition model embedded in the host electronic device of the AVI system, the AVI system is able to conduct an appearance inspection of the article with acceptable inspection accuracy.

For achieving the primary objective mentioned above, the present invention provides an embodiment of the flexible and intuitive system, which is applied to conduct a configuration parameter setting of an automated visual inspection (AVI) system that comprises a host electronic device embedded with a first defect recognition model therein, an article transferring equipment, N numbers of robotic arms, and N numbers of cameras respectively held by the N numbers of robotic arms; wherein N is a positive integer, and the flexible and intuitive system comprising:
- an electronic device, being coupled to the host electronic device, thereby being in communication with each said camera and each said robotic arm through the host electronic device;
  - wherein the electronic device comprises a first processor and a first memory coupled to the first processor, the first memory storing a first application program, and the first processor executing the first application program so as to be configured to:
  - record, after said robotic arm is controlled to move said camera one time, an external camera parameter comprising at least one selected from a group consisting of photographing height, photographing angle and photographing distance; wherein there are K sets of said external camera parameter recorded after said camera is moved K times, and K being a positive integer;
  - record, after everytime said camera is moved by said robotic arm and subsequently receives a camera setting treatment, an internal camera parameter comprising at least one selected from a group consisting of aperture, depth of field, shutter speed, ISO, and focus; wherein there are K sets of said internal camera parameter recorded after said camera is applied with the camera setting treatment K times;
  - acquire, by controlling the N numbers of cameras, N frames of article images from an article after everytime said camera receives the camera setting treatment;
  - transmit, M×N frames of article images to a remote electronic device; and
  - update, after the remote electronic device utilizes the M×N frames of article images to re-train said first defect recognition model or produce a second defect recognition model, the first defect recognition model embedded in the host electronic device based on the re-trained first defect recognition model or the second defect recognition model; wherein M is a positive integer.

In one embodiment, the electronic device is selected from a group consisting of smart phone, tablet computer, desktop computer, laptop computer, and all-in-one computer, and the first processor executes the first application program so as to be further configured to:
  - update, based on K sets of said external camera parameter and K sets of said internal camera parameter, an equipment controlling program embedded in the host electronic device.

In one embodiment, said camera is integrated in a mobile electronic device selected from a group consisting of smart phone and tablet computer.

In one embodiment, the mobile electronic device has an inertial sensor module and a LiDAR module, and the first processor executes the first application program so as to be further configured to:
  - collect, by controlling the inertial sensor module, a three-dimensional movement data of said camera during everytime said camera is moved by said robotic arm;
  - collect, by controlling the LiDAR module, a spatial data of said camera during everytime said camera is moved by said robotic arm; and calculate, based on the three-dimensional movement data and the spatial data, said photographing height, said photographing angle and said photographing distance after said robotic arm is controlled to move said camera one time.

In one embodiment, said camera is accommodated in a fixture held by said robotic arm, and said robotic arm is disposed with an inertial sensor module and a LiDAR module thereon.

In one embodiment, the inertial sensor module and the LiDAR module are coupled to the first processor, and the first processor executes the first application program so as to be further configured to:
  - collect, by controlling the inertial sensor module, a three-dimensional movement data of said camera during everytime said camera is moved by said robotic arm;
  - collect, by controlling the LiDAR module, a spatial data of said camera during everytime said camera is moved by said robotic arm; and
  - calculate, based on the three-dimensional movement data and the spatial data, said photographing height, said photographing angle and said photographing distance after said robotic arm is controlled to move said camera one time.

In one embodiment, the first processor stores K sets of said external camera parameter and K sets of said internal camera parameter in the first memory.

In one embodiment, the electronic device further comprises a display, and the first processor executes the first application program so as to be further configured to:
  - show, by controlling the display, a user interface (UI); and label, after the user interface is operated to classify at least one of the M×N frames of article images with a defect classification item, the at least one article image with at least one defect information correspondingly.

In one embodiment, the host electronic device comprises a second processor and a second memory, the article transferring equipment comprises a conveyor apparatus including at least one motor and at least one distance sensor, and the first processor executes the first application program so as to be further configured to:

record, after the motor is controlled to operation by a rotation speed (RPM), the rotation speed as a motor controlling parameter;

record, after the conveyor apparatus is controlled to transfer the article to be in a photographing region of one said camera, a transferring distance as a conveyor apparatus controlling parameter; and update, based on the motor controlling parameter and the conveyor apparatus controlling parameter, an equipment controlling program that is stored in the second memory.

In one embodiment, the AVI system further comprises N numbers of light sources, and the first processor executes the first application program so as to be further configured to:

record, after said light source receive a setting treatment, a light source parameter comprising at least one selected from a group consisting of illumination region, illuminance, light color, and color temperature; and update, based on the light source parameter, the equipment controlling program stored in the second memory.

In one embodiment, the second memory stores a second application program, and the second processor executes the second application program so as to be configured to:

move, by controlling said robotic arm, said camera to face a surface of the article;

direct, by controlling said light source, a detection light to the surface of the article;

acquire, by controlling said camera, one frame of article image from surface of the article; and conduct, by using said first defect recognition model, a defect inspection and recognition of the article image.

In one embodiment, the AVI system further comprises a discharge apparatus that is disposed adjacent to an article discharging port of the article transferring equipment, and the first processor executes the first application program so as to be further configured to:

record, after the article transferring equipment transfers the article by N+1 numbers of horizontal movements, the last one of the N+1 numbers of horizontal movements as an article discharge parameter;

record, after said discharge apparatus picks up the article from the article transferring equipment and then puts down the article in a first collection box, a discharge apparatus setting parameter comprising at least one selected from a group consisting of first article picking up position, first article picking up angle and first article putting down position; and update, based on the article discharge parameter and the discharge apparatus setting parameter, the equipment controlling program stored in the second memory.

In one embodiment, the AVI system further comprises a feeding apparatus that is disposed adjacent to an article feeding port of the article transferring equipment, and the first processor executes the first application program so as to be further configured to:

record, after said feeding apparatus picks up the article from a second collection box and then puts down the article on the conveyor apparatus of the article transferring equipment, a feeding apparatus setting parameter comprising at least one selected from a group consisting of second article picking up position, second article picking up angle and second article putting down position; and update, based on the feeding apparatus setting parameter, the equipment controlling program stored in the second memory.

BRIEF DESCRIPTION OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE PREFERRED EMBODIMENTS

To more clearly describe a flexible and intuitive system according to the present invention, embodiments of the present invention will be described in detail with reference to the attached drawings hereinafter.

Figure 1:
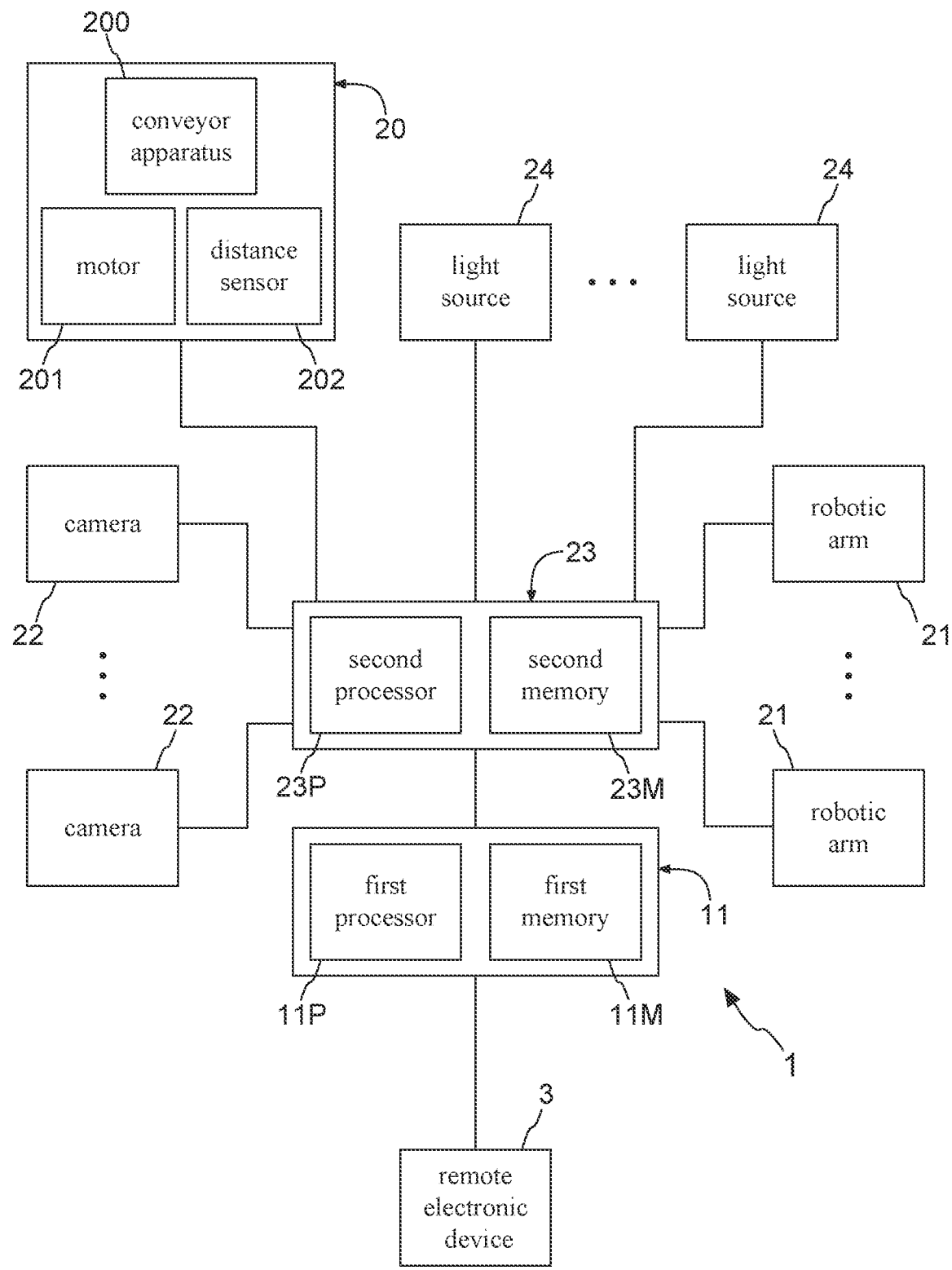
FIG. 1 is a block diagram of an automated visual inspection (AVI) system including a flexible and intuitive system according to the present invention.
Figure 2A:
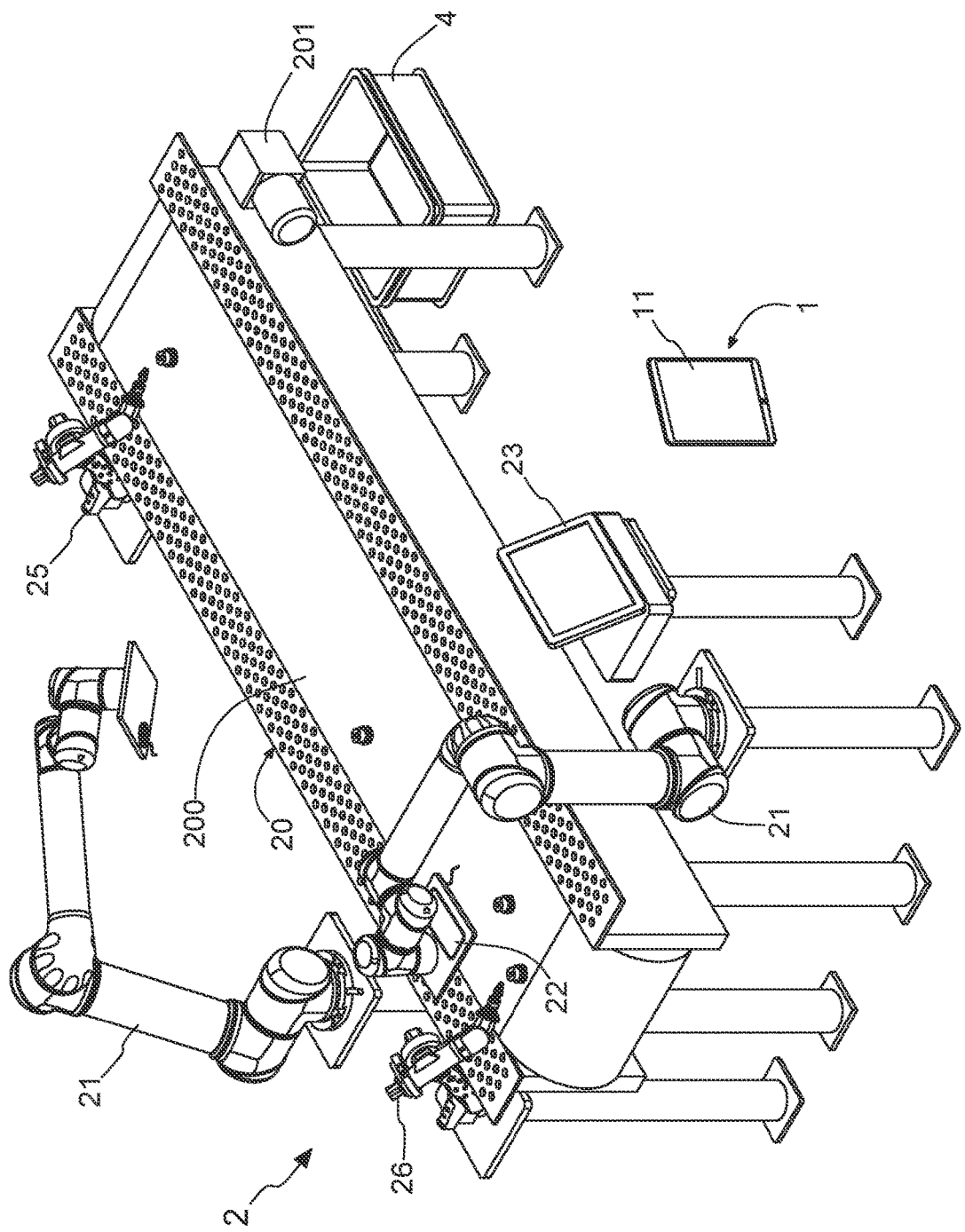
FIG. 2A is a first stereo diagram of the AVI system shown in FIG. 2.
Figure 2B:
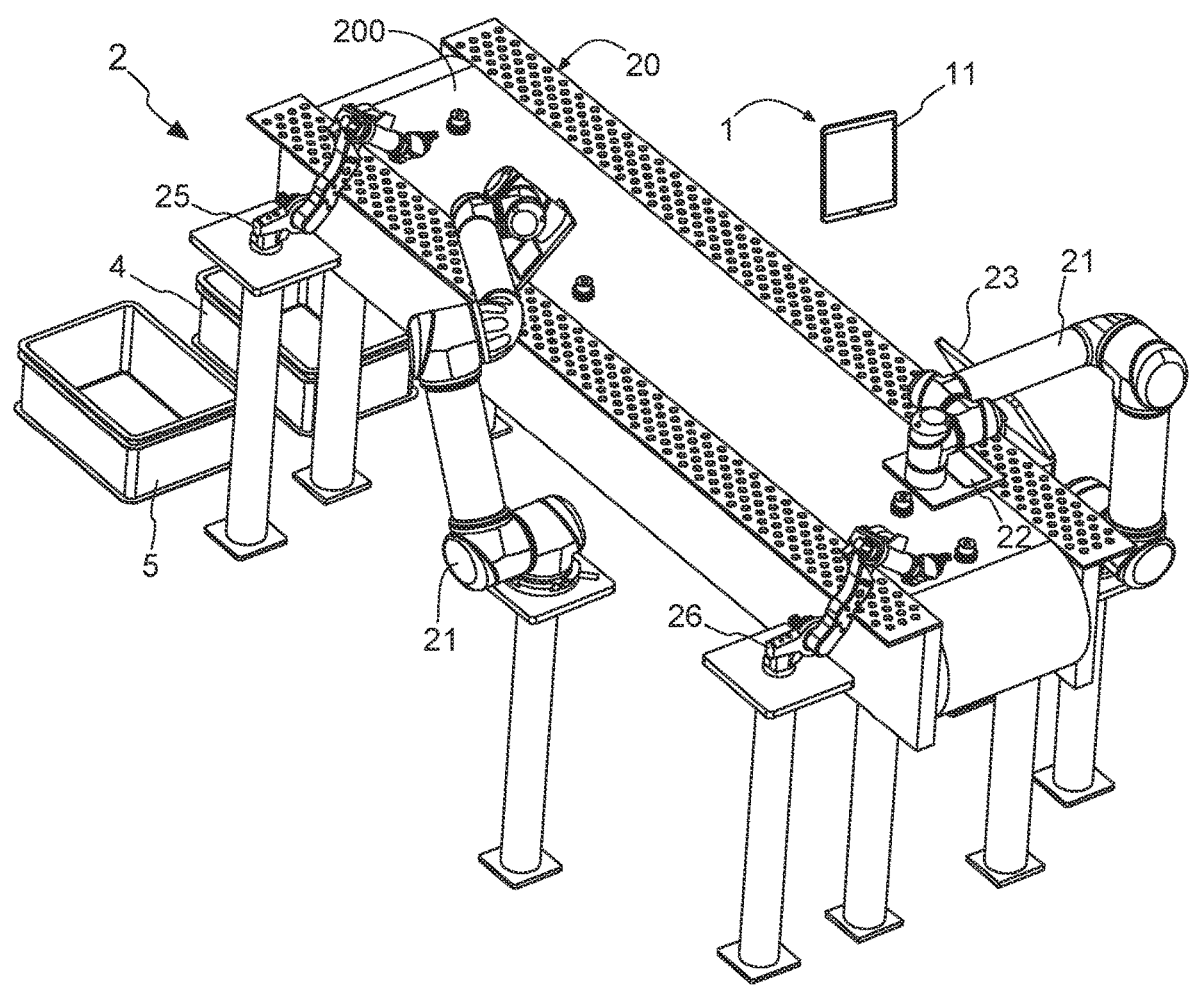
FIG. 2B is a second stereo diagram of the AVI system shown in FIG. 2.

FIG. 1 illustrates a block diagram of an automated visual inspection (AVI) system including a flexible and intuitive system according to the present invention. Moreover, FIG. 2A and FIG. 2B are a first stereo diagram and a second stereo diagram of the AVI system shown as FIG. 2. According to FIG. 1, FIG. 2A, a flexible and intuitive system 1 according to the present invention is disclosed, and the flexible and intuitive system 1 is applied to conduct a configuration parameter setting of an automated visual inspection (AVI) system 2 that comprises a host electronic device 23, an article transferring equipment 20, N numbers of robotic arms 21, N numbers of cameras 22 respectively held by the N numbers of robotic arms 21, N numbers of light sources 24, a feeding apparatus 26, and a discharge apparatus 25, wherein N is a positive integer. As explained in more detail below, the host electronic device 23 is embedded with a first defect recognition model and an equipment controlling program therein.

When operating the AVI system 2 to conduct an appearance inspection (also called "defect inspection") of a lot of articles (e.g., gears), the electronic device 23 is configured to control the operations of the article transferring equipment 20, the feeding apparatus 26, the N numbers of robotic arms 21, the N numbers of cameras 22, the N numbers of light sources 24, and the discharge apparatus 25. As described in more detail below, the feeding apparatus 26 (e.g., a robotic arm) is controlled to pick up the article from a collection box or a previous-stage article transferring equipment and then put down the article on a conveyor apparatus 200 of the article transferring equipment 20. After that, a first one of the N numbers of robotic arms 21 is controlled to move a first one of the N numbers of cameras 22 to face a surface of the article. In such case, the first camera 22 has been set to have a photographing height, a photographing angle and a photographing distance relative to the article. Subsequently, because the article locates in a photographing region of the first camera 22, the first camera 22 is controlled to acquire an article image from the surface of the article. Briefly speaking, the first robotic arm 21, the first camera 22 and first one of the N numbers of light sources 24 are disposed at a first inspection stage, and the first robotic arm 21 and the first camera 22 are correspondingly set based on the photographing height, the photographing angle and the photographing distance before the first camera 22 photographs the surface of the article. In addition, at the first inspection stage the first robotic arm 21 may be further controlled to move the first camera 22 to have another one photographing height, another one photographing angle and another one photographing distance relative to the article, so as to make the first camera 22 face another one surface of the article. After that, the first camera 22 is controlled to acquire another one article image of the article; and on this basis, at the first inspection stage the first robotic arm 21 and the first camera 22 may be further set for acquiring other article images from different surfaces of the article.

Similarly, when the article is next transferred from the first inspection stage to a second inspection stage, a second one of the N numbers of robotic arms 21 is controlled to move a second one of the N numbers of cameras 22, thereby making the second camera 22 have a specific photographing height, a specific photographing angle and a specific photographing distance relative to the article. Subsequently, because the article locates in a photographing region of the second camera 22, the second camera 22 is controlled to acquire an article image from a specific surface of the article. In addition, at the second inspection stage the second robotic arm 21 may be further controlled to move the second camera 22 to have another one photographing height, another one photographing angle and another one photographing distance relative to the article, so as to make the second camera 22 face another one surface of the article. After that, the second camera 22 is controlled to acquire another one article image of the article.

It needs to particularly explain that, said camera 22 is applied with a camera setting treatment before being controlled to photograph the article, and said camera 22 has a specific aperture, a specific depth of field, a specific shutter speed, a specific ISO, and a specific focus after the camera setting treatment is completed. As a result, M×N frames of article images are obtained after the article passes through N numbers of inspection stages. Subsequently, the host electronic device 23 utilizes the first defect recognition model to conduct a defect inspection and recognition of each said article image, so as to determining whether there is at least one defect existing in said article image. Therefore, if said article image is inspected to contain at least one defect, the first defect recognition model further classifies said article image with a defect classification item.

After the defect inspection and recognition of each said article image is completed, the host electronic device 23 subsequently controls the discharge apparatus 25 to pick up the article from the conveyor apparatus 200 and then put down the article in a first collection box 5 if the article is classified as a NG (not good) product. On the contrary, the discharge apparatus 25 moves the article into a second collection box 4 if the article is classified as a normal product.

In conclusion, the AVI system 2 comprising a host electronic device 23, an article transferring equipment 20, N numbers of robotic arms 21, N numbers of cameras 22 respectively held by the N numbers of robotic arms 21, N numbers of light sources 24, a feeding apparatus 26, and a discharge apparatus 25 can be operated to conduct an appearance inspection of a specific article like model A gear. However, because the AVI system 2 is set for conducting the appearance inspection of model A gear through a configuration parameter setting, it is uncertain that the AVI system 2 can be directly operated for conducting an appearance inspection of another one article like model B gear with acceptable inspection accuracy. Accordingly, before operating the AVI system 2 to conduct the appearance inspection of a lot of model B gears, operator or inspection personnel needs to firstly operate the flexible and intuitive system 1 shown as FIG. 1, FIG. 2A and FIG. 2B, thereby conducting a configuration parameter setting of the AVI system 2.

According to FIG. 1, FIG. 2A and FIG. 2B, the flexible and intuitive system 1 comprises an electronic device 11, and the electronic device 11 is coupled to the host electronic device 23, so as to further communicate with each said robotic arm 21 and each said camera 22 through the host electronic device 23. According to the present invention, the electronic device 11 comprises a first processor 11P and a first memory 11M coupled to the first processor 11P, in which the first memory 11M stores a first application program, such that the first processor 11P is configured to perform a plurality of functions while executing the first application program. The plurality of functions comprises:

recording, after said robotic arm 21 is controlled to move said camera 22 one time, an external camera parameter comprising at least one selected from a group consisting of photographing height, photographing angle and photographing distance;

recording, after everytime said camera 22 is moved by said robotic arm 21 and subsequently receives a camera setting treatment, an internal camera parameter comprising at least one selected from a group consisting of aperture, depth of field, shutter speed, ISO, and focus;

acquiring, by controlling the N numbers of cameras 22, N frames of article images from an article after everytime said camera 22 receives the camera setting treatment;

transmitting, M×N frames of article images to a remote electronic device 3; and updating, after the remote electronic device 3 utilizes the M×N frames of article images to re-train said first defect recognition model or produce a second defect recognition model, the first defect recognition model embedded in the host electronic device 23 based on the re-trained first defect recognition model or the second defect recognition model.

It is worth explaining that K and M are both a positive integer, there are K sets of said external camera parameter recorded after said camera is moved K times, and there are K sets of said internal camera parameter recorded after said camera is applied with the camera setting treatment K times.

In one embodiment, after the electronic device 11 is booted, the first processor 11P accesses the first memory 11M so as to executes the first application program, thereby being configured to control a display of the electronic device 11 to show a user interface (UI). Therefore, the operator or the inspection personnel can start the configuration parameter setting of the AVI system 2 by operating the user interface.

During the configuration parameter setting, first of all, the inspection personnel is required to use his hand to pull and/or push a first one of the N numbers of robotic arms 21, so as to make the first robotic arm 21 move a first one of the N numbers of cameras 22 to face a surface of the type B gear (i.e., the article). In such case, the first camera 22 has a photographing height, a photographing angle and a photographing distance, and the first memory 11M stores the photographing height, the photographing angle and the photographing distance in a form of an external camera parameter. Continuously, the inspection personnel is required to set the first camera 22 to have an aperture, a depth of field, a shutter speed, an ISO, and a focus, thereby making the first camera 22 be able to clearly photograph all types of defects from the surface of the model B gear. In the meantime, the first memory 11M stores the aperture, the depth of field, the shutter speed, the ISO, and the focus in a form of an internal camera parameter. It is understood that the first robotic arm 21, the first camera 22 and first one of the N numbers of light sources 24 are disposed at a first inspection stage, and the first robotic arm 21 and the first camera 22 may be set by the inspection personnel again for making the first camera 22 acquire another one article image from another one surface of the model B gear. In such case, the first processor 11P stores another one corresponding external camera parameter and another one corresponding internal camera parameter in the first memory 11M.

Similarly, when the article (i.e., the model B gear) is transferred from a i-th inspection stage to a j-th inspection stage, a j-th one of the N numbers of robotic arms 21 is controlled to, by the hand of the inspection personnel, move a j-th one of the N numbers of cameras 22, thereby making the j-th camera 22 have a specific photographing height, a specific photographing angle and a specific photographing distance relative to the article. Subsequently, because the article locates in a photographing region of the j-th camera 22, the j-th camera 22 is set by the inspection personnel to have a specific depth of field, a specific shutter speed, a specific ISO, and a specific focus, so as to make the j-th camera 22 be able to clearly photograph all types of defects from a specific surface of the model B gear. It is understood that i∈N and j∈N.

Therefore, during the configuration parameter setting the first processor 11P is configured to record, after said robotic arm 21 is controlled to move said camera 22 one time, an external camera parameter comprising a photographing height, a photographing angle and a photographing distance, such that there are K sets of said external camera parameter recorded after said camera is moved K times. Moreover, the first processor 11P is also configured to record, after everytime said camera 22 is moved by said robotic arm 21 and subsequently receives a camera setting treatment, an internal camera parameter comprising an aperture, a depth of field, a shutter speed, an ISO, and a focus, such that there are K sets of said internal camera parameter recorded after said camera is applied with the camera setting treatment K times. As a result, after K sets of said external camera parameter and K sets of said internal camera parameter are recorded, the first processor 11P is subsequently configured to update, based on the K external camera parameters and the K internal camera parameter, the equipment controlling program embedded in the host electronic device 23.

Moreover, after the inspection personnel controls the last one of the N numbers of cameras 22 to clearly photograph all types of defects from at least one specified surface of the model B gear, the first processor 11P obtains M×N frames of article images of the model B gear, and then stores the M×N frames of article images in the first memory 11M. It needs to particularly explain that, in any one inspection stage the inspection personnel may classify any one article image with a defect classification item after completing an article image reviewing by operating the user interface. Correspondingly, the first processor 11P is configured to label, after the user interface is operated to classify any one article image with a defect classification item, the article image with a defect information correspondingly. As a result, the labeled M×N frames of article images consist of P frames of normal article images and Q frames of defect-containing article images, wherein P+Q=M×N. Therefore, After the inspection personnel completes the robotic arm setting parameter of each said robotic arm 21 and the camera setting operation of each said camera 22, the first processor 11P is configured to transmit the M×N frames of article images to a remote electronic device 3. Eventually, the first processor 11P is configured to update, after the remote electronic device 3 utilizes the M×N frames of article images to re-train said first defect recognition model or produce a second defect recognition model, the first defect recognition model embedded in the host electronic device 23 based on the re-trained first defect recognition model or the second defect recognition model.

Figure 4A:
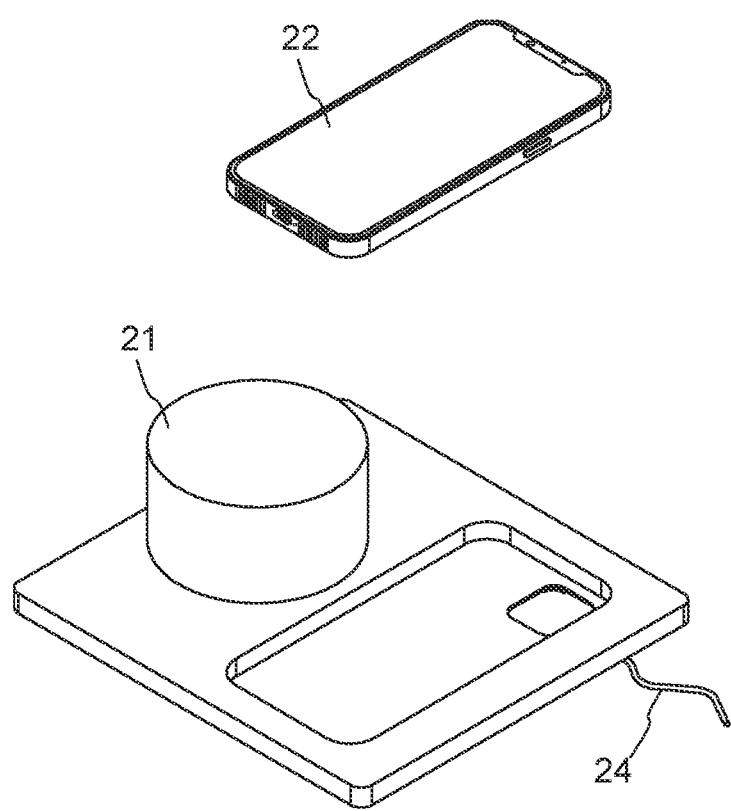
FIG. 4A is a first stereo diagram of j-th one of N numbers of robotic arms, j-th one of N numbers of cameras and j-th one of N numbers of light sources.
Figure 4B:
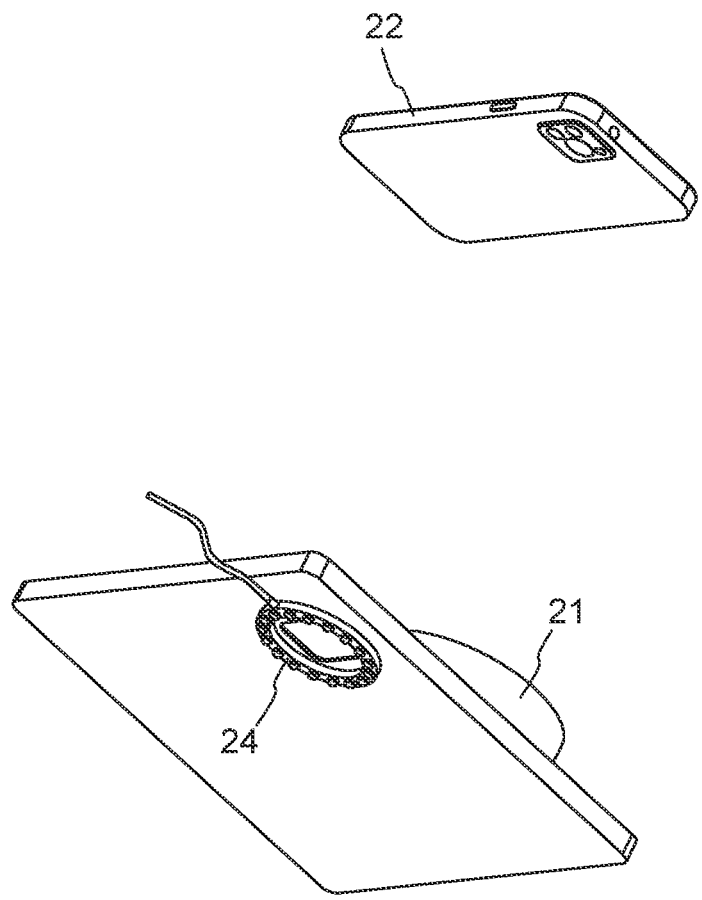
FIG. 4B is a second stereo diagram of the j-th robotic arm, the j-th camera and the j-th light source.

Furthermore, FIG. 4A and FIG. 4B illustrate a first stereo diagram and a second stereo diagram of the j-th robotic arm 21, the j-th camera 22 and a j-th one of N numbers of light sources 24. In one practicable embodiment, said camera 22 is integrated in a mobile electronic device like a smart phone or a tablet computer, and the mobile electronic device is accommodated in a fixture that is held by said robotic arm 21. Moreover, the mobile electronic device has an inertial sensor module and a LiDAR module, and the first processor 11P executes the first application program so as to be further configured to:

collect, by controlling the inertial sensor module, a three-dimensional movement data of said camera 22 during everytime said camera 22 is moved by said robotic arm 21;

collect, by controlling the LiDAR module, a spatial data of said camera 22 during everytime said camera 22 is moved by said robotic arm; 21 and calculate, based on the three-dimensional movement data and the spatial data, said photographing height, said photographing angle and said photographing distance after said robotic arm 21 is controlled to move said camera 22 one time.

In another one practical embodiment, said camera 21 is accommodated in a fixture held by said robotic arm 21, and said robotic arm 21 is disposed with one inertial sensor module and one LiDAR module thereon. Moreover, the inertial sensor module and the LiDAR module are coupled to the first processor 11P, and the first processor 11P executes the first application program so as to be further configured to:

collect, by controlling the inertial sensor module, a three-dimensional movement data of said camera 22 during everytime said camera 22 is moved by said robotic arm 21;

collect, by controlling the LiDAR module, a spatial data of said camera 22 during everytime said camera 22 is moved by said robotic arm 21; and calculate, based on the three-dimensional movement data and the spatial data, said photographing height, said photographing angle and said photographing distance after said robotic arm 21 is controlled to move said camera 22 one time.

It needs to further explain that, the electronic device 11 of the flexible and intuitive system 1 can be, but is not limited to, a smart phone, a tablet computer, a desktop computer, a laptop computer, or an all-in-one computer.

Figure 3A:
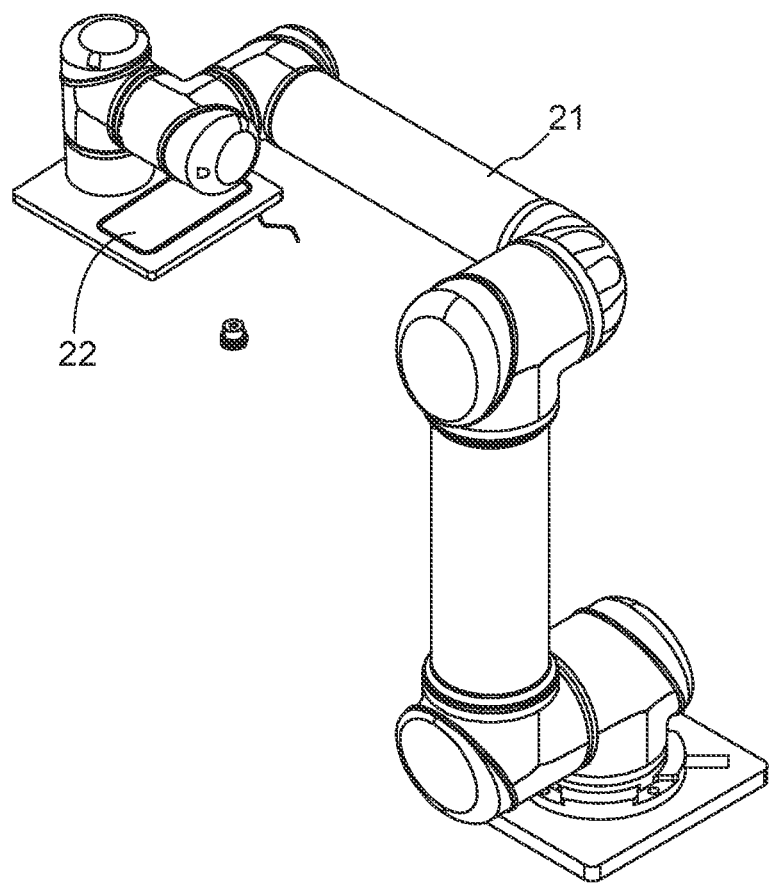
FIG. 3A is a first stereo diagram of i-th one of N numbers of robotic arms.
Figure 3B:
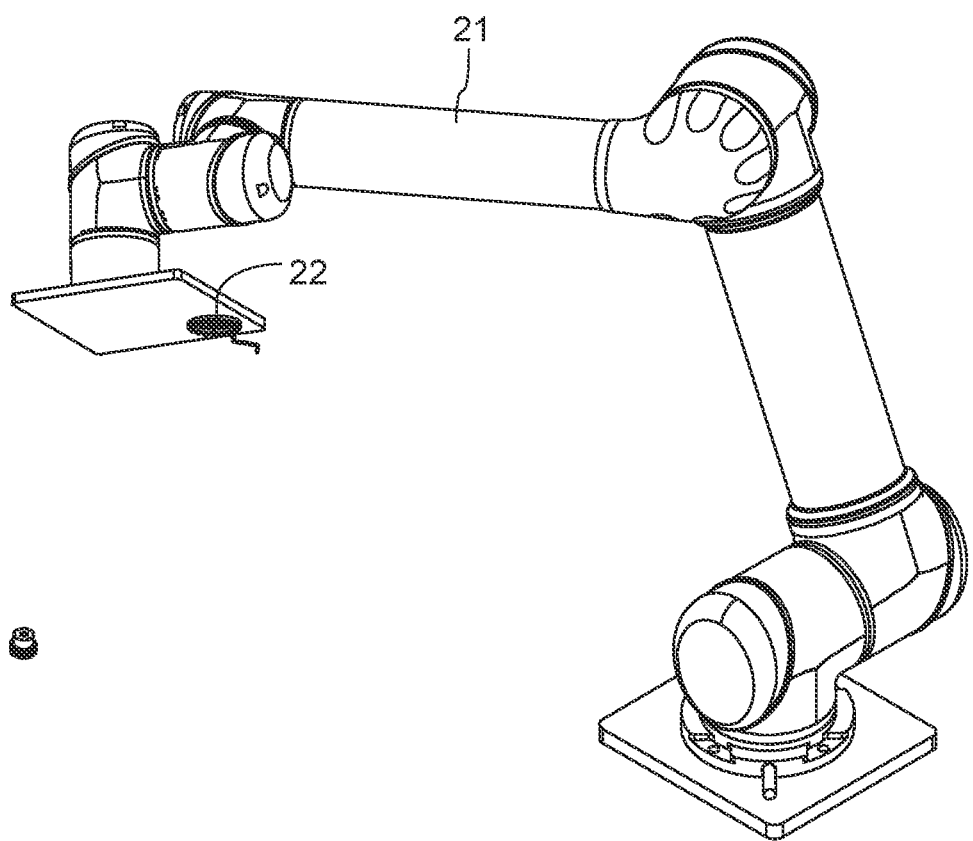
FIG. 3B is a second stereo diagram of the i-th robotic arm.

In addition, FIG. 2, FIG. 3A and FIG. 3B also depict that the host electronic device 23 comprises a second processor 23P and a second memory 23M, the article transferring equipment 20 comprises a conveyor apparatus 200, at least one motor 201 for driving the conveyor apparatus 200 and at least one distance sensor 202. Correspondingly, the first processor 11P executes the first application program so as to be further configured to: record, after the motor 201 is controlled by the host electronic device 23 to operation by a rotation speed (RPM), the rotation speed as a motor controlling parameter;
 record, after the conveyor apparatus 200 is controlled to transfer the article to be in a photographing region of one said camera 21, a transferring distance as a conveyor apparatus controlling parameter; and
 update, based on the motor controlling parameter and the conveyor apparatus controlling parameter, an equipment controlling program that is stored in the second memory 23M.

FIG. 2, FIG. 3A and FIG. 3B further depict that the AVI system 2 further comprises N numbers of light sources 24. Correspondingly, the first processor 11P executes the first application program so as to be further configured to:
 record, after the inspection personnel conduct a setting treatment of said light source 24, a light source parameter comprising illumination region, illuminance, light color, and color temperature; and
 update, based on the light source parameter, the equipment controlling program stored in the second memory 23M.

Briefly speaking, the flexible and intuitive system 1 is not only operated for updating the first defect recognition model stored in the second memory 23M of the host electronic device 23, but also can be operated for updating the equipment controlling program stored in the second memory 23M.

Moreover, because the AVI system 2 further comprises a feeding apparatus 26 that is disposed adjacent to an article feeding port of the article transferring equipment 20, the inspection personnel can operate the user interface to conduct a parameter setting of the feeding apparatus 26, such that the first processor 11P executes the first application program so as to be further configured to:
 record, after said feeding apparatus 26 picks up the article from a collection box or a previous-stage article transferring equipment and then puts down the article on the conveyor apparatus 200 of the article transferring equipment 20, a feeding apparatus setting parameter comprising article picking up position, article picking up angle and article putting down position; and
 update, based on the feeding apparatus setting parameter, the equipment controlling program stored in the second memory.

Furthermore, because the AVI system 2 further comprises discharge apparatus 25 that is disposed adjacent to an article discharging port of the article transferring equipment 20, the inspection personnel can operate the user interface to conduct a parameter setting of the discharge apparatus 25, such that the first processor 11P executes the first application program so as to be further configured to:
 record, after the article transferring equipment 20 transfers the article by N+1 numbers of horizontal movements, the last one of the N+1 numbers of horizontal movements as an article discharge parameter;
 record, after said discharge apparatus 25 picks up the article from the article transferring equipment 20 and then puts down the article in a first collection box 5 or a second collection box 4, a discharge apparatus setting parameter comprising article picking up position, article picking up angle and article putting down position; and
 update, based on the article discharge parameter and the discharge apparatus setting parameter, the equipment controlling program stored in the second memory.

In conclusion, the present invention discloses a flexible and intuitive system 1, which is presented in a form of an electronic device 11 for use in conducting a configuration parameter setting of an automated visual inspection (AVI) system 2 that comprises a host electronic device 23, at least one robotic arm 21 and at least one camera 22 that is held by the at least one robotic arm 21. The electronic device 11 is coupled to the host electronic device 23, thereby communicating with the camera 22 and the robotic arm 21. Therefore, when conducting the configuration parameter setting, at least one time of robotic arm setting operation for the robotic arm 21 and at least one time of camera setting operation for the camera are conducted, such that a plurality of article images are acquired from an article by the camera 22. After said robotic arm setting operation and said camera setting operation are completed, an external camera setting parameter and an internal camera setting parameter corresponding to the article are recorded by the electronic device 11. After that, the electronic device 11 transmits the plurality of article images to a remote electronic device 3, and then the remote electronic device 3 utilizes the article images to update (re-train) a defect recognition model. As a result, after electronic device updates, based on the re-trained defect recognition model, the defect recognition model embedded in the host electronic device 23 of the AVI system 2, the AVI system 2 is able to conduct an appearance inspection of the article with acceptable inspection accuracy.

Therefore, through above descriptions, all embodiments and their constituting elements of the flexible and intuitive system according to the present invention have been introduced completely and clearly. Moreover, the above description is made on embodiments of the present invention. However, the embodiments are not intended to limit the scope of the present invention, and all equivalent implementations or alterations within the spirit of the present invention still fall within the scope of the present invention.

What is claimed is:

1. A flexible and intuitive system, being applied to conduct a configuration parameter setting of an automated visual inspection (AVI) system that comprises a host electronic device embedded with a first defect recognition model therein, an article transferring equipment, N numbers of robotic arms, and N numbers of cameras respectively held by the N numbers of robotic arms; wherein N is a positive integer, and the flexible and intuitive system comprising:
 an electronic device, being coupled to the host electronic device, thereby being in communication with each said camera and each said robotic arm through the host electronic device;
 wherein the electronic device comprises a first processor and a first memory coupled to the first processor, the first memory storing a first application program, and the first processor executing the first application program so as to be configured to:
record, after said robotic arm is controlled to move said camera one time, an external camera parameter comprising at least one selected from a group consisting of photographing height, photographing angle and photographing distance; wherein there are K sets of said external camera parameter recorded after said camera is moved K times, and K being a positive integer;
record, after everytime said camera is moved by said robotic arm and subsequently receives a camera setting treatment, an internal camera parameter comprising at least one selected from a group consisting of aperture, depth of field, shutter speed, ISO, and focus; wherein there are K sets of said internal camera parameter recorded after said camera is applied with the camera setting treatment K times;
acquire, by controlling the N numbers of cameras, N frames of article images from an article after everytime said camera receives the camera setting treatment;
transmit, M×N frames of article images to a remote electronic device; and update, after the remote electronic device utilizes the M×N frames of article images to re-train said first defect recognition model or produce a second defect recognition model, the first defect recognition model embedded in the host electronic device based on the re-trained first defect recognition model or the second defect recognition model; wherein M is a positive integer.

2. The flexible and intuitive system of claim 1, wherein the electronic device is selected from a group consisting of smart phone, tablet computer, desktop computer, laptop computer, and all-in-one computer, and the first processor executing the first application program so as to be further configured to:
update, based on K sets of said external camera parameter and K sets of said internal camera parameter, an equipment controlling program embedded in the host electronic device.

3. The flexible and intuitive system of claim 1, wherein said camera is integrated in a mobile electronic device selected from a group consisting of smart phone and tablet computer.

4. The flexible and intuitive system of claim 3, wherein the mobile electronic device has an inertial sensor module and a LiDAR module, and the first processor executing the first application program so as to be further configured to:
collect, by controlling the inertial sensor module, a three-dimensional movement data of said camera during everytime said camera is moved by said robotic arm;
collect, by controlling the LiDAR module, a spatial data of said camera during everytime said camera is moved by said robotic arm; and
calculate, based on the three-dimensional movement data and the spatial data, said photographing height, said photographing angle and said photographing distance after said robotic arm is controlled to move said camera one time.

5. The flexible and intuitive system of claim 1, wherein said camera is accommodated in a fixture held by said robotic arm, and said robotic arm being disposed with an inertial sensor module and a LiDAR module thereon.

6. The flexible and intuitive system of claim 5, wherein the inertial sensor module and the LiDAR module are coupled to the first processor, and the first processor executing the first application program so as to be further configured to:
collect, by controlling the inertial sensor module, a three-dimensional movement data of said camera during everytime said camera is moved by said robotic arm;
collect, by controlling the LiDAR module, a spatial data of said camera during everytime said camera is moved by said robotic arm; and
calculate, based on the three-dimensional movement data and the spatial data, said photographing height, said photographing angle and said photographing distance after said robotic arm is controlled to move said camera one time.

7. The flexible and intuitive system of claim 1, wherein the first processor stores K sets of said external camera parameter and K sets of said internal camera parameter in the first memory.

8. The flexible and intuitive system of claim 1, wherein the electronic device further comprises a display, and the first processor executing the first application program so as to be further configured to:
show, by controlling the display, a user interface (UI); and
label, after the user interface is operated to classify at least one of the M×N frames of article images with a defect classification item, the at least one article image with at least one defect information correspondingly.

9. The flexible and intuitive system of claim 1, wherein the host electronic device comprises a second processor and a second memory, the article transferring equipment comprising a conveyor apparatus including at least one motor and at least one distance sensor, and the first processor executing the first application program so as to be further configured to:
record, after the motor is controlled to operation by a rotation speed (RPM), the rotation speed as a motor controlling parameter;
record, after the conveyor apparatus is controlled to transfer the article to be in a photographing region of one said camera, a transferring distance as a conveyor apparatus controlling parameter; and
update, based on the motor controlling parameter and the conveyor apparatus controlling parameter, an equipment controlling program that is stored in the second memory.

10. The flexible and intuitive system of claim 9, wherein the AVI system further comprises N numbers of light sources, and the first processor executing the first application program so as to be further configured to:
record, after said light source receive a setting treatment, a light source parameter comprising at least one selected from a group consisting of illumination region, illuminance, light color, and color temperature; and
update, based on the light source parameter, the equipment controlling program stored in the second memory.

11. The flexible and intuitive system of claim 10, wherein the second memory stores a second application program, and the second processor executing the second application program so as to be configured to:
move, by controlling said robotic arm, said camera to face a surface of the article;
direct, by controlling said light source, a detection light to the surface of the article;
acquire, by controlling said camera, one frame of article image from surface of the article; and
conduct, by using said first defect recognition model, a defect inspection and recognition of the article image.

12. The flexible and intuitive system of claim 11, wherein the AVI system further comprises a discharge apparatus that is disposed adjacent to an article discharging port of the article transferring equipment, and the first processor executing the first application program so as to be further configured to:
- record, after the article transferring equipment transfers the article by N+1 numbers of horizontal movements, the last one of the N+1 numbers of horizontal movements as an article discharge parameter;
- record, after said discharge apparatus picks up the article from the article transferring equipment and then puts down the article in a first collection box, a discharge apparatus setting parameter comprising at least one selected from a group consisting of first article picking up position, first article picking up angle and first article putting down position; and
- update, based on the article discharge parameter and the discharge apparatus setting parameter, the equipment controlling program stored in the second memory.

13. The flexible and intuitive system of claim 12, wherein the AVI system further comprises a feeding apparatus that is disposed adjacent to an article feeding port of the article transferring equipment, and the first processor executing the first application program so as to be further configured to:
- record, after said feeding apparatus picks up the article from a second collection box and then puts down the article on the conveyor apparatus of the article transferring equipment, a feeding apparatus setting parameter comprising at least one selected from a group consisting of second article picking up position, second article picking up angle and second article putting down position; and
- update, based on the feeding apparatus setting parameter, the equipment controlling program stored in the second memory.

* * * * *